Aug. 8, 1933. J. McGAVACK 1,921,575
CONCENTRATION AND PURIFICATION OF LATEX
Filed March 16, 1929
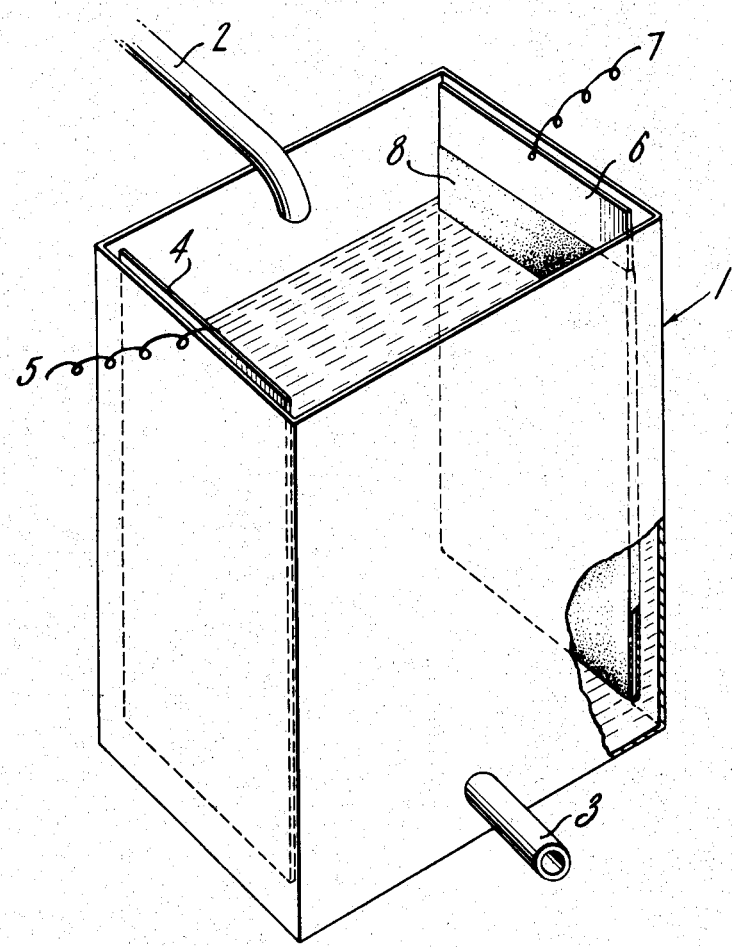
Inventor
JOHN McGAVACK
By his Attorney
Walter L. Pipes Patented Aug. 8, 1933

1,921,575

UNITED STATES PATENT OFFICE 1,921,575

CONCENTRATION AND PURIFICATION OF LATEX

John McGavack, Jackson Heights, N. Y., assignor to The Naugatuck Chemical Company, Naugatuck, Conn., a Corporation of Connecticut Application March 16, 1929. Serial No. 347,743

10 Claims. (Cl. 204—1)

This invention relates to a method of treating latex of rubber and similar materials, more particularly to a method of concentrating and purifying latex using an impressed electrical potential, and the product thereof.

There are a number of methods known to the art of concentrating and purifying ordinary latex such as filtering, the use of hydrophilic colloids, such as Irish moss, glue, tragacanth gum and other materials of like nature; also the methods of using pectin and ammonium alginate. By the use of colloids or gums one may get a latex of fairly high concentration, sometimes by repeating the process several times, in addition to obtaining a latex freed largely from the non-rubber constituents. These methods of employing the use of gums, hydrophilic colloids, gelatin, Karaya gum, pectin, ammonium alginate etc., however, require considerable time to carry out the said concentration and purification. Ordinarily, the shortest time is about 24 hours, while sometimes as long as three days are required before a concentration of about 55% solids is obtained. Moreover, in using such creaming agents as Karaya gum, pectin, Irish moss, ammonium alginate, increasing the amount of creaming agent to decrease the concentration of serum solids in the creamed latex layer, results in a lower degree of creaming in a given time.

An object of this invention is to produce a highly concentrated and purified latex in an appreciably shorter time than that provided by the above known methods. Another object is to enable a concentration of latex with less loss of solids and hence a higher recovery of total solids in the cream. Another object is to facilitate the creaming of latex by a hydrophilic colloid or gum so as to reduce the creaming time and obtain an increased yield of total solids, in an economical manner. Other objects will be apparent from the detailed description of the invention.

The drawing shows more or less diagrammatically and partly in section one embodiment of an apparatus for carrying out the process.

Accordingly the invention comprises subjecting a volume of latex in a relatively static condition, or a continuously or intermittently moving volume of latex, to an electrical potential or strain, using for this purpose either direct or an ordinary alternating current. The latex may be shocked or subjected to the electric current for a short period of time, or continuously so far as the imposition of electrical potential is concerned. More specifically normal latex, that is, latex such as that of Hevea brasiliensis which is normally shipped into this country, may be first treated with any of the materials known as creaming agents, then the latex is subjected to the electrical strain and after this treatment the latex is allowed to stand whereupon very quickly, separation proceeds in such a manner that a major portion of the water and water soluble constituents can be removed. If necessary the latex may be re-subjected to the same treatment. The time required will be anywhere from 5 to 25% of the time ordinarily required when the process is carried out without the electrical treatment. When the body of latex between the electrodes is freely subjected to electrical current, the temperature of the latex will rise due to the resistance of the latex to current flow, but though this heating can be availed of to facilitate creaming, it adds to the cost of operation. Therefore, one or both of the electrodes surface in contact with latex may be covered either partially or completely with insulating material to reduce or restrict the current flow through the latex, thereby reducing the electrical energy expended as heat radiation. Any type of insulator that can be applied in thin coats, which is not readily susceptible to water or dilute solutions of ammonia can be used, such as thin coatings of glass or porcelain, hardened bakelite varnish, collodion, chlorinated rubber, polymerized rubber hydrocarbon, Vulcalock, polymerized styrol. In this manner there will be no great amount of electrical energy absorbed, while still subjecting the latex to substantially the same electrical potential or strain. Even in such a case the rate of creaming is from three to four times as fast as by the use of the known methods of creaming.

In the drawing there is shown more or less diagrammatically an embodiment of an apparatus suitable for carrying out the process. In this drawing the numeral 1 designates a receptacle for the latex, having an inlet pipe 2 and a discharge pipe 3. Supported in the receptacle in any suitable manner is an electrode 4 connected by the wire 5 to a suitable source of electrical energy. Also mounted in the receptacle and spaced from the electrode 4, is an electrode 6 which may be connected by the wire 7 to the source of electrical energy. The numeral 8 designates an insulating material such as that above described which may be applied in a thin coat.

Other expedients for reducing the current flow through the latex may be availed of. The voltage may be decreased; for instance, instead of using 110 volts across the electrodes and coating or insulating one of the electrodes, the same result may be accomplished by decreasing the voltage directly. Comparably, 50 volts consumed about ⅙ of the amount of current consumed by 110 volts. Voltage may be decreased in any known manner, as for instance by an external resistance, or transformer, in the line.

In determining the rate of creaming, there are a number of factors which have to be taken into consideration with a given normal latex and electrodes. These factors which are variable are (a) distance between electrodes (b) potential of the current applied, (c) rate of flow of latex between the electrodes (d) temperature of the latex (e) area of the electrode and (f) cross section of the container. For example if 110 volts A. C. are used then the distance between the electrodes and the flow of latex between same should be different than if 220 volts A. C. are used. Of course in each case the electrode should be of the proper area. This precaution is to prevent an undue increase in current density and a possible small rectification of the current causing deposition at the surface of the electrode. Although wide variations in the current density may be used, very satisfactory results are accomplished with a value of .1 of a kilowatt hour per square inch of one electrode surface, passing at the same time between the electrodes one gallon of latex per square inch.

An example of the invention using an uncoated electrode is as follows: Normal latex (about 33% solids) containing .2 parts of ammonium alginate per 100 parts of total solids in the latex is fed by gravity through a float valve into and through one cell of a hard rubber storage battery box, the ends of which are fitted with electrodes having an area of 30 square inches, and which electrodes are placed four inches apart. 25 gallons of latex per hour is passed between the electrodes and the overflow from near the top of the battery is allowed to run into a creaming receptacle. The applied A. C. voltage is 110. If the voltage is 220 then the flow of latex should be 100 gallons per hour. A substantially uncoagulated cream having a solids concentration of about 55% is obtained in between one and two hours instead of the 24 to 36 hours required by the usual method of allowing the mixture to stand, without employing the electrical treatment.

If it is desired to decrease the amount of solids in the serum, this may be done by increasing the amount of creaming agent. About the same degree of creaming and creaming time will be maintained. For instance by the electrical method of substantially 38% volume separation of serum takes place with .3 grams of ammonium alginate, in slightly less than 2 hours. As compared with the use of .2 grams of alginate by the same method, the serum solids show a decrease of about 25%. On the other hand in using .3 grams of ammonium alginate in the ordinary practice omitting the electrical method, the separation of serum even after about 80 hours does not reach 38% by volume, although the amount of serum solids are somewhat less than when .2 grams of alginate are used in the same manner.

When using the same method, but insulating one of the electrodes by a colloidal membrane and placing the electrodes 10 centimeters apart, the creaming rate is about twice as slow as where the electrode is not covered. The temperature of the latex remains substantially constant and the electrical energy, measured by a kilowatt meter, is about 1/6 as much as when the electrode is not coated.

The relative merits of concentrating and purifying latex to approximately 55% solids concentration by the usual method, and the improved method is shown as follows:

|  | Voltage applied | Time of creaming | Relative current consumed |
| --- | --- | --- | --- |
|  |  | Hours |  |
| Untreated samples |  | 24 | 0 |
| Coated electrodes | 110 A.C. | 5 | 10 |
| Bare electrodes | 110 A.C. | 3 | 60 |

By using coated electrodes the rate of creaming is reduced but there is the advantage of also reducing the electrical energy to about ⅙. However this factor of cost of electrical energy is small being about a few tenths of a mill per pound of total solids. The electrical method of creaming is applicable with practically all types of creaming agents. Instead of using ammonium alginate .4–.7 parts of Karaya gum, .4–.8 parts of dry pectin, .6–.9 parts of Irish moss pulp in 2% dilute aqueous solution, may be used.

The expression "uncoagulated" in the description and claims is used to indicate a condition of substantially no coagulation, that is no substantial change in the colloidal condition of the rubber hydrocarbon, and the expression excludes those partial stages of coagulation which are not visible to the naked eye but which may be clearly seen under a microscope.

With the detailed disclosure above given, it is obvious that modifications will suggest themselves, for instance, the creaming agent can be added successfully before, after or during the application of the electrical action, and it is not desired to limit the invention otherwise than as set forth in the appended claims.

Having thus described my invention, what I claim and desire to protect by Letters Patent is:

1. A method of concentrating and purifying latex which comprises treating the latex with a creaming agent, and continuously passing the latex between electrode surfaces connected with a source of electrical current, at least one of said electrode surfaces being covered with an insulator.

2. A method of concentrating and purifying latex which comprises continuously passing latex containing a creaming agent between electrode surfaces connected with a source of alternating electric current, allowing the latex to stand, and separating the rubber-containing portion from the watery serum.

3. A method of concentrating and purifying latex which comprises continuously passing latex containing a creaming agent between electrode surfaces connected with a source of electric current, at least one of said electrode surfaces being covered with an insulator, allowing the latex to stand, separating the rubber-containing portion from the watery serum, and repeating the process to further concentrate and purify the latex.

4. A method of concentrating and purifying latex which comprises continuously passing latex containing an organic hydrophilic colloid between electrode surfaces connected with a source of electric current, at least one of said electrode surfaces being covered with an insulator.

5. A method of concentrating and purifying latex which comprises treating the latex with an organic hydrophilic colloid, and continuously passing the latex between electrode surfaces connected with a source of electric current, at least one of said electrode surfaces being covered with an insulator, allowing the latex to stand, and recovering a latex cream containing a lower percentage of non-rubber constituents than the untreated latex.

6. A method of concentrating and purifying latex which comprises treating the latex with ammonium alginate and subjecting the latex to an applied electrical potential or strain by passing an alternating current through it.

7. A method of concentrating and purifying latex which comprises continuously passing latex containing ammonium alginate between electrode surfaces connected with a source of electric current, at least one of said electrode surfaces being covered with an insulator, allowing the latex to stand, and separating the rubber-containing portion from the watery serum.

8. A method of concentrating and purifying latex which comprises continuously passing latex containing ammonium alginate between electrode surfaces connected with a source of alternating electric current, allowing the latex to stand, and separating the rubber-containing portion from the watery serum.

9. A method of concentrating and purifying latex which comprises continuously passing latex containing ammonium alginate between electrode surfaces having with respect to each other a widely varying electrical potential, said electrodes being connected with a source of alternating electric current, allowing the latex to stand, and separating the rubber-containing portion from the watery serum.

10. A method of concentrating and purifying latex which comprises subjecting the latex to a creaming agent and to an applied difference of electrical potential between two electrodes, at least one of which is covered with insulating material where exposed to the latex bath.

JOHN McGAVACK.